INVENTOR
NORMAN F. BROWN
BY Wm. Atkinson & Mauchinney
ATTORNEYS

INVENTOR
NORMAN F. BROWN
BY Wilkinson & Mawhinney
ATTORNEYS

FREE PISTON FOR USE IN EDUCTION PIPES OF APPARATUS FOR RAISING LIQUID IN WELLS

Original Filed Feb. 7, 1948 7 Sheets-Sheet 3

INVENTOR
NORMAN F. BROWN
BY Wilkinson & Mawhinney
ATTORNEYS

Aug. 18, 1953 N. F. BROWN Re. 23,698

FREE PISTON FOR USE IN EDUCTION PIPES OF APPARATUS FOR RAISING LIQUID IN WELLS

Original Filed Feb. 7, 1948 7 Sheets-Sheet 4

INVENTOR
NORMAN F. BROWN
BY Wilkinson & Mawhinney
ATTORNEYS

FIG. 11.
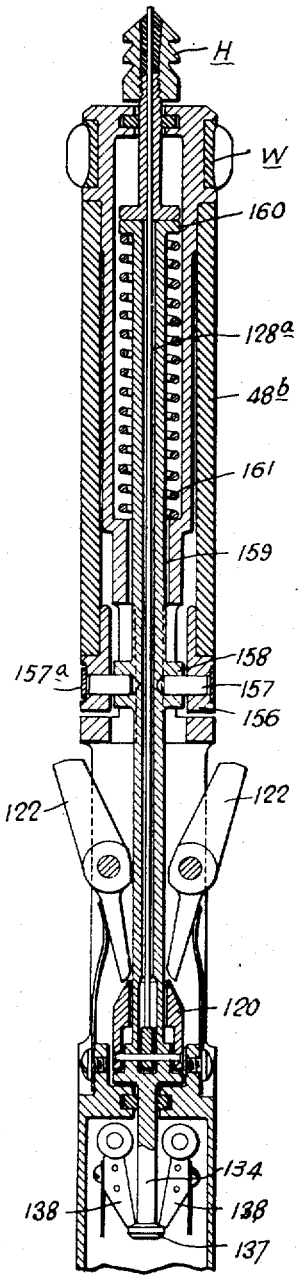
FIG. 10.
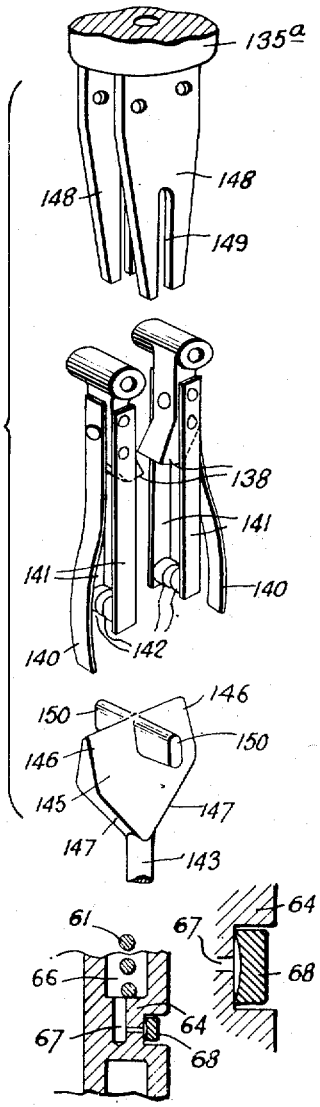
FIG. 4a.
INVENTOR
NORMAN F. BROWN
BY Wilkinson & MacKinnon
ATTORNEYS INVENTOR
NORMAN F. BROWN
Wilkinson & Mawhinney
ATTORNEYS Aug. 18, 1953 N. F. BROWN Re. 23,698

FREE PISTON FOR USE IN EDUCTION PIPES OF APPARATUS FOR RAISING LIQUID IN WELLS

Original Filed Feb. 7, 1948 7 Sheets-Sheet 7

INVENTOR
NORMAN F. BROWN
BY Wilkinson & Mawhinney
ATTORNEYS

Reissued Aug. 18, 1953 Re. 23,698

UNITED STATES PATENT OFFICE 23,698

FREE PISTON FOR USE IN EDUCTION PIPES OF APPARATUS FOR RAISING LIQUID IN WELLS

Norman Fraser Brown, London, England, assignor to N. F. B. Displacement Pump Co. Limited, London, England Original No. 2,555,112, dated May 29, 1951, Serial No. 6,828, February 7, 1948. Application for reissue May 1, 1952, Serial No. 285,431. In Great Britain February 13, 1947

39 Claims. (Cl. 103—52)

Matter enclosed in heavy brackets [ ] appears in the original patent but forms no part of this reissue specification; matter printed in italics indicates the additions made by reissue.

This invention relates to free pistons for pumping apparatus for raising natural oil and other liquid in wells wherein a slug of liquid is lifted up an oil eduction pipe to the well surface by gas pressure.

When the gas which lifts the slug up the pipe is in direct contact with the base of the liquid slug, some penetration of the gas into the column of liquid will take place tending to produce breakages in the column and a resultant loss in efficiency. To prevent this it is known to provide a floating plunger adapted to be positioned at the lower end of the eduction pipe during the collection of the slug in the pipe, the plunger being adapted to rise vertically in the pipe beneath the slug as it is raised, to isolate the base of the slug from the gas which lifts it, the plunger falling by gravity down the pipe when the slug has been delivered to the surface.

According to the present invention a free piston adapted to travel up and down in substantially vertical liquid eduction pipe of a well is provided with means for automatically securing it to said pipe when it reaches the limit of its downward travel and means responsive to a variation in the pressure or pressures of fluid flowing through an orifice for effecting the release of the holding means to permit the free piston to travel up to the pipe.

The invention also includes a free piston adapted to travel up and down a substantially vertical liquid eduction pipe of a well has means for automatically securing it to said pipe when it reaches the limit of its downward travel and means, responsive to a variation in differential pressure created across an orifice by fluids flowing therethrough, for effecting the release of the holding means to permit the free piston to travel up the pipe.

The invention further includes apparatus for raising liquid from wells by gaseous pressure comprising a liquid eduction pipe having a socket at its lower end, and a free piston adapted to travel up and down said pipe and having means for automatically securing it within the socket when it reaches the limit of its downward movement, a lower chamber connected with the eduction pipe for collecting liquid from the well, means for supplying gaseous pressure to displace liquid from the lower chamber into the eduction pipe past the socket and free piston secured therein, to form a slug of liquid above the free piston, means for automatically releasing the free piston from the socket in accordance with a change in differential pressure created by fluid flowing through an orifice, whereby the piston is freed to be lifted up the pipe beneath the slug by gaseous pressure.

To enable the invention to be fully understood it will now be described with reference to the accompanying drawings, in which:

Fig. 1 is a graph showing a characteristic curve indicating the variations in differential pressure across an orifice through which fluids are forced to flow during a phase of a displacement pumping cycle. It will be understood that although actual values for pressure differences and time will vary according to individual conditions and therefore cannot readily be shown in Fig. 1, the shape of the curve in Fig. 1 is characteristic of all applications of the invention.

Fig. 4a is a detail of part of Fig. 4.

Fig. 10 is an exploded view of the trigger release mechanism shown in Fig. 9.

Fig. 11 is a sectional view of the upper half of a further modified form of free piston.

Figures 2, 3, 3A, 6, 7:
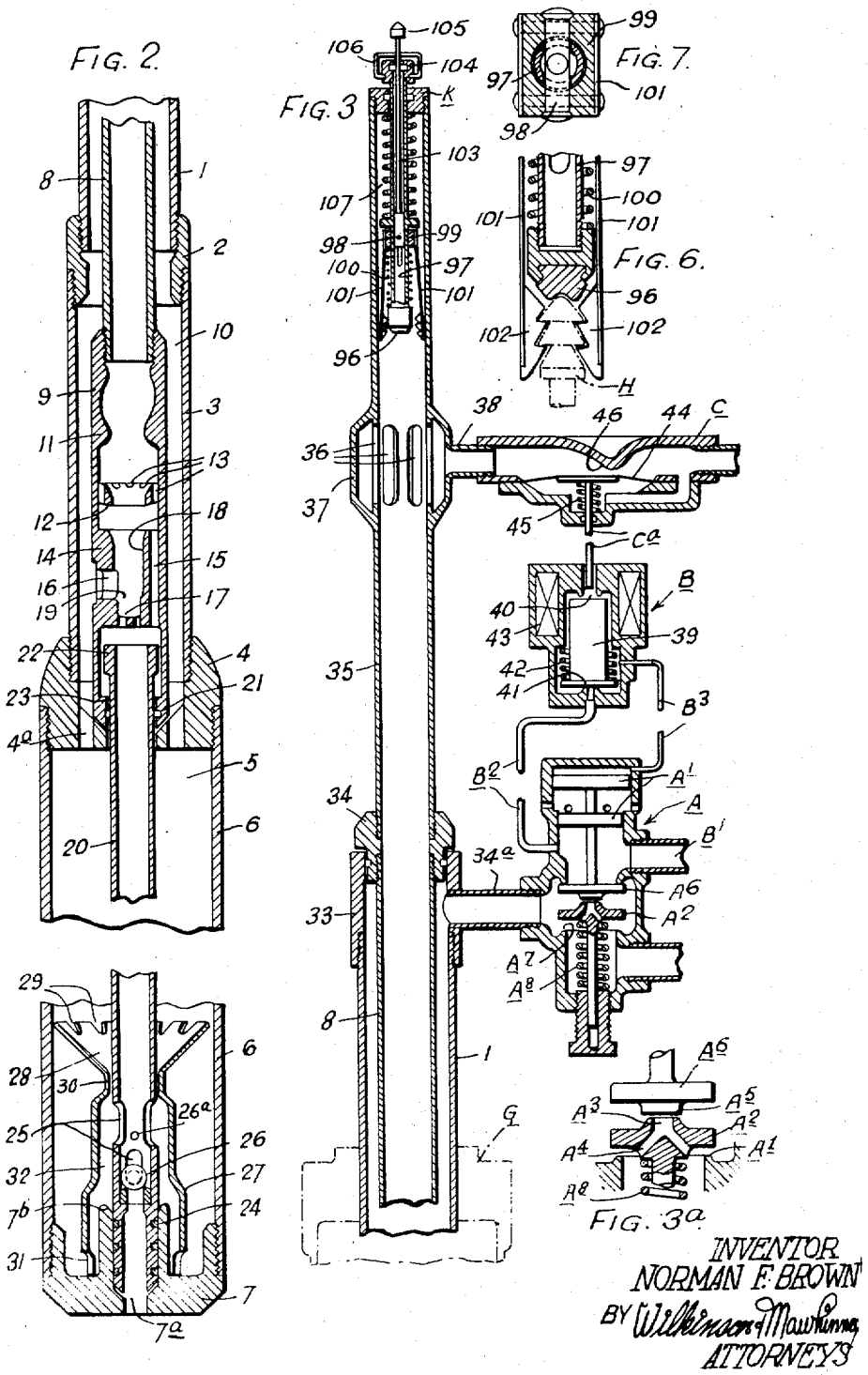
Fig. 2 shows in section the sub-surface equipment of one form of well equipment operating the "open tube" displacement pumping system such as described in prior U. S. patent specification 1,930,312 and shows one form of socket for receiving a free piston.
Fig. 3 shows in section the above ground apparatus for use with the equipment shown in Fig. 2.
Fig. 3a shows a section of Fig. 3.
Figs. 6 and 7 show details of the catcher mechanism shown in Fig. 3.

In the accompanying drawings, Figs. 2 and 3 show in diagrammatic form one form of apparatus for raising liquid by the "open tube" displacement pumping system. As shown, the sub-surface equipment comprises an outer tube 1 connected by a collar 2 with a large diameter tube 3, the lower end of which is connected by a collar 4 with a still larger diameter tube 6, the interior of which forms the "lower" or "displacement"

chamber 5 of the apparatus. The bottom end of the tube 6 is closed by a plug 7 having an aperture 7a and an annular wall 7b forming a recess.

An inner tube or eduction pipe 8 is arranged in the tubes 1 and 3, its lower end being connected with a tubular member 9 adapted to form a housing to receive a free piston to be hereinafter described, the diameter of the member 9 being such as to provide an annular space 10 between the member 9 and tube 3. The housing member 9 is provided with an annular shoulder 11 having an internal bore slightly less than the bore of the tube 8. At a predetermined distance below the shoulder 11, an inwardly extending flange 12 is provided which has a series of axial passages 13. The flange 12 has a similar internal bore to that of the shoulder 11. A tubular socket portion 14 is provided below the flange 12, and has a flared mouth, one or more axial passages 15, a lateral gas by-pass passage 16, and a closed base having passages 17. The bore of the socket member 14 is not uniform but comprises a portion 18 the diameter of which may be slightly greater than a portion 19, but slightly less than the bores in the shoulder 11, and flange 12. The collar 4 has a series of axial passages 4a connecting the chamber 5 with the annular space 10.

A pipe 20 extends axially into the chamber 5, its upper end extending into a recess in the member 9 through a gland 21. The pipe 20 is permitted a limited axial movement relative to the member 9, which is limited by an annular collar 22 adapted to cooperate with a shoulder 23. The lower end of the pipe 20 is fitted with a series of sealing rings 24 which engage the walls of the recess 7b. The lower end of the pipe 20 is also provided with a series of slots 25, and a non-return valve 26. A pin or the like 26a is provided to limit the upward movement of the valve 26.

A flow guide 27 for liquid is provided surrounding the lower end of the pipe 20 and comprises a flared upper end 28 having slots 29, a neck 30 and slots 31. The medial portion of the flow guide is spaced from the pipe 20 to provide an annular fluid flow passage 32.

The above ground equipment is shown in Fig. 3, and as shown the upper end of the tube 1 extends through and is supported by a casing head indicated by G and its upper end is connected with a tubing head 33 having a plug 34 from which extends a pipe 35 having slots 36 surrounded by a cage 37. A pipe 38 is connected with the cage and is adapted to receive fluid raised from the well and deliver it to suitable receiving plant, not shown.

Valve means generally indicated by A are provided and comprise a 3-way valve including a spring-loaded exhaust valve A2 having a series of holes A4, Fig. 3a, and a relatively small aperture A3 adapted to be engaged and closed by an auxiliary valve A5 integral with the inlet valve A6. A pilot valve unit B is also provided and comprises a member 39, the upper end of which is adapted to control an exhaust port 40 and the lower end, an inlet port 41. The exhaust port 40 has a greater cross sectional area than the port 41. In the particular embodiment shown, the member 39 is a floating armature of an electro-magnet and is normally urged by the spring 42 to close the inlet port 41 but is raised to close the exhaust port 40 when the coil 43 is energised. The coil 43 is adapted to be energised by suitable remote control means (not shown) whereby the coil is energised for a fixed and comparatively short period of time to open the port 41 and close the port 40, at pre-selectable intervals of time.

A diaphragm 44 is provided in a housing C, in the pipe line 38 and has a rod Ca adapted to engage the member 39. The diaphragm is adapted to be actuated by the differential pressure across a restriction 46 created by the flow of liquid through the pipe 38 substantially as described in prior U. S. patent application No. 767,947, now Patent No. 2,515,291, dated July 18, 1950. The diaphragm and rod are normally held up by the spring 45 and a restriction 46 is provided adjacent to the diaphragm, the arrangement being such that the differential pressure created by the gas flow from the pipes 8, 35 ahead of the liquid rising up the pipe is insufficient to depress the diaphragm but the differential pressure across the restriction 46 created by the liquid flowing past it is sufficient to depress the diaphragm and depress the rod Ca to force the member 39 down in its casing.

At the commencement of a pumping cycle an electrical circuit including the coil 43 is energised to raise the armature member 39 to close the exhaust port 40 and open the inlet port 41. Gas at pressure then flows from the pipe B1, to the pipe B2, valve unit B, pipe B3 to the upper side of a two-step piston A1 having atmosphere vents between the steps, to force the piston down and open the valve A6 to supply gas at pressure from pipe B′ via pipe 24a to the outer tubing 1. The coil 43 is maintained energised for only a relatively short period but when the coil is no longer energised, the member 39 is maintained in raised position by the pressure existing in the pipe B2 to maintain the exhaust port 40 closed and the port 41 open and the inlet port A6 remains open to supply gas under pressure to the outer tubing 1, the exhaust ports A3, A7 being held closed by the valves A5 and A2 respectively. When the slug of liquid is raised up the well tubing during the later phases of the pumping cycle, and flows over the diaphragm 44, the differential pressure created across the restriction 46 depresses the diaphragm and its rod Ca, forces down the member 39 to reverse the position of the various valves in units A and B.

Figure 4:
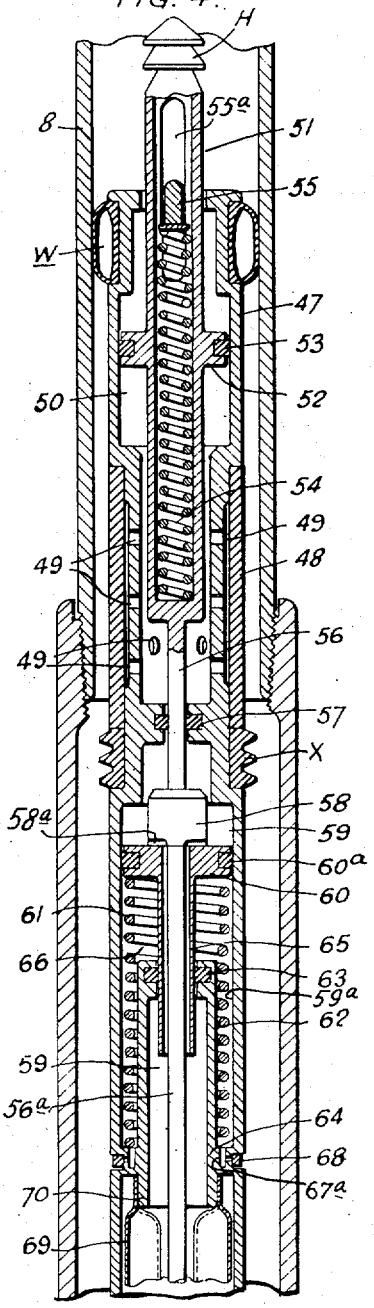
Figs. 4 and 5 are sectional views of the upper and lower halves of a free piston according to one embodiment of the invention.
Figure 5:
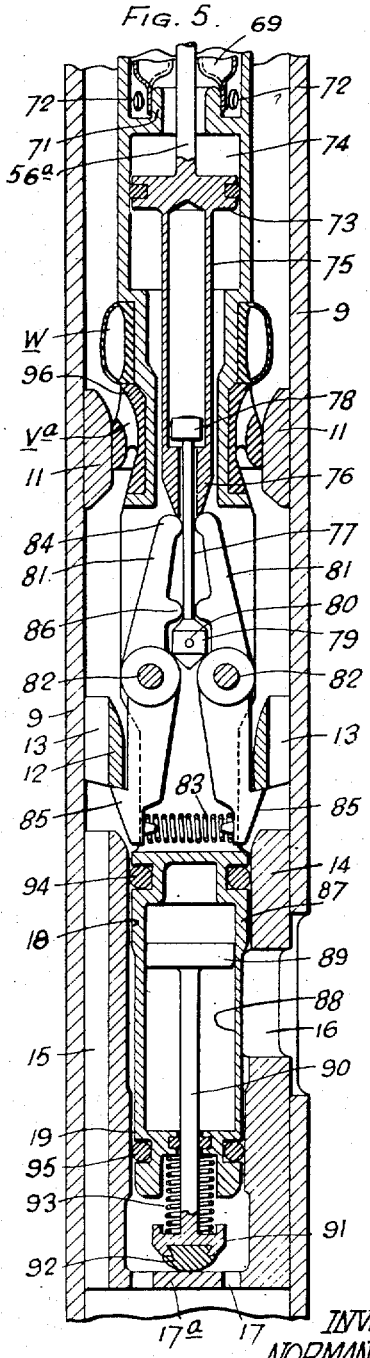

One form of free piston is shown in Figs. 4 and 5 and as shown it comprises a body 47 which is of less diameter than the pipe 8 and is provided with one or more series of wing guides W adapted to centralise the free piston as it ascends *on its power stroke* and descends *on its return stroke within* the pipe 8. The body 47 is also provided with *sealing means in the form of* an annular packing member 48 of synthetic rubber or other suitable resilient material. The upper and lower ends of the packing 48 are secured to the body 47 and its medial portion covers a cylindrical portion of the body having apertures 49, which connect the inner face of the packer with a cylinder 50 in the body 47. A tube 51 is reciprocably mounted in the body 47 and its upper end is provided with a catcher head H. The upper portion of the tube 51 carries a piston 52 having a sealing ring 53 making a sliding fluid-tight fit with the wall of the cylinder 50. The tube 51 is closed at the lower end and houses a spring 54 which is compressed to a partially loaded condition between the closed end of the tube and a cross bar 55 which extends through a slot 55a in the upper end of the tube 51 and is fixed to the body 47. A rod 56 is secured to the bottom of the tube 51 and extends downwardly through a gland 57 and is provided with a collar 58 normally spaced from the gland 57 and located within a cylindrical portion 59. A piston 60 having a sealing ring 60a is reciprocably mounted in the cylindrical portion 59a and is normally urged to engage and raise the collar 58 by a spring 61 whereby the rod 56 and tube 51 are normally held in their uppermost positions as shown in Fig. 4, the spring 61 having a greater upward thrust than the downward thrust of spring 54. An inner sleeve 62 fitted with a sealing ring 63 extends upwardly from a shoulder 64 on the body of the free piston, and a tube 65 depending from the piston 60 extending into the sleeve 62, makes sliding sealing engagement with the ring 63. The space 66 below the piston 60 is filled with air or gas at low pressure and the collar 58 is formed with slots 58a to ensure that the collar 58 does not completely seal the upper end of the tube 65 when it rests thereon. The space in the cylinder 50 below the piston 52 is filled with liquid such as oil which is adapted to be forced through the apertures 49 to expand the packing 48 radially outwards, when the piston 52 is moved downwardly. Small bore passages 67 lead from the exterior of the body of the free piston to the space 66, the outer end of the passages being covered by a ring of synthetic rubber or other resilient material 68 which nests in an annular groove. This arrangement is shown in the fragmentary detail view of Fig. 4a and is designed to serve as a one-way valve. The arrangement is such that any gas or liquid which may leak into the space 66 past the seals 60a and 63, and raise the pressure in the space 66, will flow out past the ring 68 when the pressure outside the body 47 is at a relatively lower pressure and it will be obvious that any liquid, that may have entered the space 66, naturally settling at the bottom, will be forced out first and followed by any excess gas. A thin flexible sheath 69 formed of synthetic rubber or other suitable material and having axial corrugations is located in the free piston and its opposite ends are secured to axially spaced lips 70 and 71. The portion of the free piston body containing the sheath has a series of holes 72 connecting the exterior of the sheath with the exterior of the free piston body and the arrangement is such that the pressure of the well fluids at the holes 72 is transmitted through the sheath to oil or like fluid which fills the interior of the sheath 69, sleeve 62 and cylinders 74, and 59 continuously connected therewith.

A rod 56a depends upon the collar 58 and its lower end carries a piston 73 which reciprocates in a cylinder 74 and is permitted a predetermined upward and downward travel. A tube 75 depends from the piston 73, its end comprising a head 76 having a conically shaped outer surface. A rod 77 extends through a hole in the head 76, the upper end of the rod having an enlarged end 78 adapted to engage a shoulder at the lower end of the tube 75 and the lower end of the rod 77 has a head 79 formed with a conical upper and lower portion. The head 79 extends within a slotted portion of the free piston body and is connected thereto by a soft metal shear pin 80 whereby the upward movement of the tube 75 and parts connected thereto is limited, while the shear pin 80 is in place and intact, and upward movement is stopped when the head 76 engages the head 78 on the rod 77. Dogs 81, preferably two in number, are pivotally mounted on pins 82, connected with the body of the free piston, the lower ends of the dogs being normally urged apart by a light spring 83. Each dog comprises a cam face 84 at the upper end and an outwardly projecting dog head 85 at the lower end and an inner cam member 86. Below the slotted portion, the free piston body has a portion 87 of reduced diameter which comprises a cylinder 88 in which is reciprocably mounted a shock absorber piston 89, the rod 90 of which extends through the base of the free piston and is provided with a cap 91 provided with a resilient buffer pad 92 and a light spring 93.

As shown in Figs. 4 and 5 the free piston is positioned in the socket at the lower end of the well tubing, sealing rings 94, 95 engaging the bores 18, 19 thereby isolating the by-pass passage 16. It will be noted that the free piston is held in the socket by the dog heads 85 on the dogs engaging under the edge of the flange 12 and when in this position a ring of synthetic rubber or like resilient material 96 engages the inner wall of the annular shoulder 11. The outside diameter of the ring 96 is such as to make a fluid-tight fit in the bore of the shoulder 11, the upper face of which is flared to facilitate entry of the ring. The ring is provided with one or more axial passages constituting a restricted passage or orifice hereinafter referred to as the orifice Va. The total cross-sectional area of the passage or passages forming the orifice Va is small in comparison with the cross-sectional area of any other passage for the upward flow of well fluids above or below the shoulder 11 while the free piston is held in the socket.

During the pump cycle, when liquid from the lower chamber 5, is forced by gaseous pressure up the passage 15 and through the orifice Va, the pressure above the orifice will be lower than the pressure below the orifice, the low pressure being transmitted through the apertures 72 to the flexible sheath 69 and through the sheath to the oil in the space 59, 74 to exert a downward thrust on the pistons 60 and 73. The higher pressure prevailing below the orifice Va is, however, transmitted directly to the underside of the piston 73. The piston 73 is therefore acted upon by the difference in pressure across the orifice Va irrespective of the absolute pressures prevailing.

Figure 1:
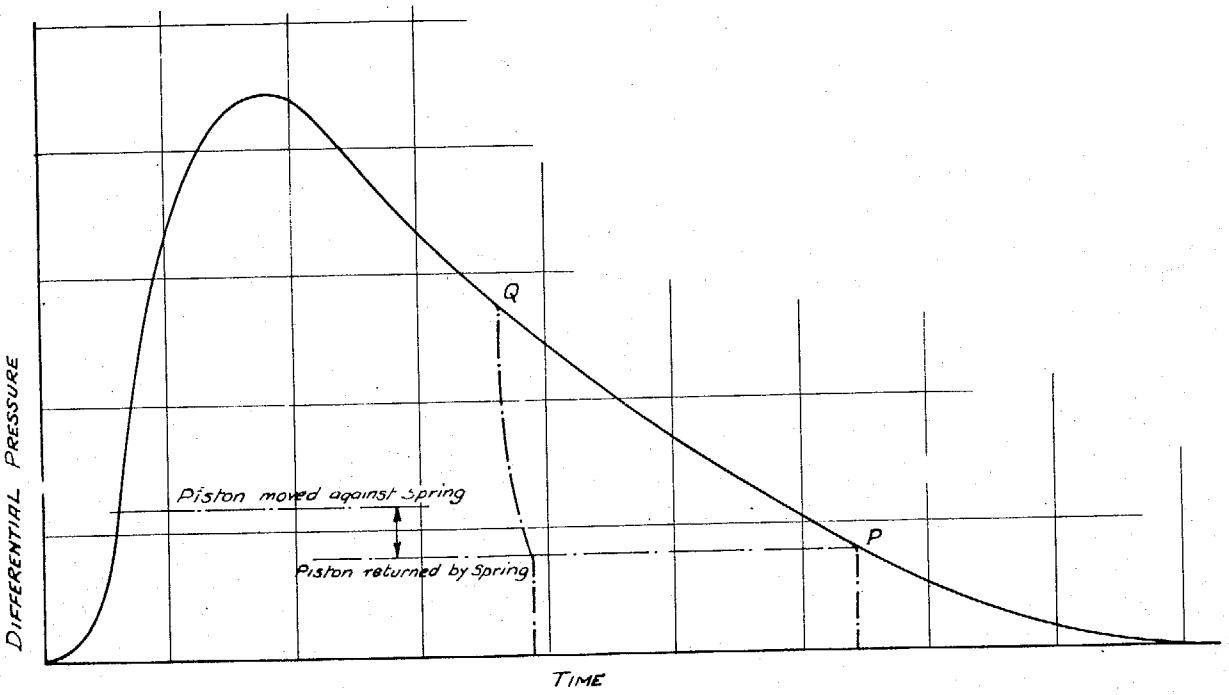

Liquid from the well enters the chamber 5 past the ball valve 26 during the appropriate phase of the pump cycle and assuming that the chamber 5 has been filled with more liquid than is required to form a normal length slug of liquid to be raised to the well surface, a cycle of operations commences with the admission of high pressure gas through the valve unit A, pipe 34a to the outer tube 1 and thence to the upper surface of the liquid in the chamber 5 where the pressure rises to a maximum much sooner than the liquid it can displace from the chamber is in fact displaced. The liquid is displaced from the chamber 5 by the gaseous pressure, through the slots 31 (Fig. 2) up the inside of the flow guide 27, through slots 25 into the pipe 20, the pressure of the liquid in the chamber 5 maintaining the ball valve 26 closed on its seat. The liquid flowing up the pipe 20 flows through the passages 15 and 13 and thence through the orifice Va upwards around the free piston to build up a slug in the pipe 8 above the free piston. At the commencement of this first or "displacement" phase of the cycle of operations when gas pressure in the chamber 5 is high and the pressure in the pipe 8 above the free piston is low, the differential pressure across the orifice Va rises rapidly as shown in the graph of Fig. 1. In consequence of the higher pressure below the orifice Va the piston 73 is raised and held up by a thrust greater than the downward thrust of the spring 54 and thus the spring 61 is relieved of this duty. As the displacing phase continues and the slug in the pipe 8 increases in length, the absolute pressure of the liquid slug above the orifice Va rises and this absolute pressure is transmitted through the apertures 72 to the flexible sheath 69 which transmits it to the clean oil in the spaces 59 and 74 and effects the depression of the piston 60 against the action of the spring 61 and the comparatively small rise in pressure in the low pressure space 56 so that the piston 60 is moved away from the collar 58. The rod 56, 56a to which the collar is attached is not, however, free to descend and it is maintained in raised position solely by the differential pressure acting on the piston 73. As the displacement phase progresses the pressure equivalent of the head of the slug of liquid above the free piston approaches the pressure of gas in the chamber 5 and accordingly the velocity of flow of the liquid through the orifice Va and the differential pressure across the orifice diminishes, as shown in the graph in Fig. 1, until it reaches the value indicated by point P, when the differential pressure acting upwards on the piston 73 is no longer sufficient to hold it up against the thrust of the spring 54. Accordingly, the rods 56, 56a and tube 75 are moved downwardly and the head 76 moves between the cam faces 84 and pivots the dogs 81 to withdraw the dog heads 85 from engagement with the flange 12. Simultaneously, the piston 52 is moved down to displace the liquid in the space 50 through the apertures 49 to expand the *sealing ring or* packer 48 radially outwards to engage the wall of the pipe 8 *so that a substantially impermeable plug is formed.* The remaining differential pressure represented in Fig. 1 by the vertical distance from the base line of the graph to the point P exerts an upward thrust on the free piston which is sufficient to overcome the weight of the free piston the weight of the slug of liquid above the free piston and the friction of the engaging parts of the free piston and socket, and the free piston leaves the socket and commences its journey up the pipe 8 to the well surface beneath the slug of liquid to be raised. At a moment just preceding the release of the free piston, the pressure of liquid at the base 17a of the socket is lower than the gas pressure at the passage 16 which acts on the sealing rings 94, 95. The difference between these pressures is the hydrostatic equivalent of the vertical distance between the bottom of the socket and the level of the liquid in the chamber 5 which at that moment is nearer the lower end of the chamber. The pressure of the gas flowing through the passage 16 is effective over the different cross-sectional areas of the bores 18, 19 and accordingly produces an upward thrust on the free piston which is additional to the pressure previously mentioned as initiating the upward movement of the free piston. Immediately the free piston is withdrawn from the socket, the gas flows through the passage 16 and under the free piston and is effective on the whole cross-sectional area of the free piston to raise it up the pipe 8, the pressure beneath the free piston being sufficiently in excess of the hydrostatic equivalent of the slug length and free piston weight together, to lift both free piston and slug to the well surface at a reasonable velocity. It will be noted that the head 76 after operating the cam faces 84 is permitted a further movement to allow the piston 52 sufficient movement to effect the efficient expansion of the packer 49. The movement permitted the piston 52 is designed to be in excess of the minimum necessary for the head 76 to release the dogs 81 and to ensure that the packer 48 will be expanded to make a satisfactory fluid-tight sliding engagement with the inner wall of the pipe 8.

As the slug and free piston rise up the pipe 8, gas above the slug is displaced through the slots 36 into the pipe 38 and passes over the diaphragm 44 without creating sufficient differential pressure to depress it. When the slug of liquid reaches the upper end of the pipe 35 it flows through the slots 36 and on flowing over the diaphragm, a higher differential pressure is created across the restriction 46 and the diaphragm is depressed against the action of the spring 45, to push the member 39 downwardly to open the exhaust port 40 and close the port 41. The spring 42 is thereafter effective to hold the member 39 down to keep the port 40 open and port 41 closed.

It will be noted that when the diaphragm is depressed, it will be spaced from the restriction 46 and accordingly an unrestricted passage is available for the flow of liquid. As the inlet port 41 is closed and the exhaust port 40 opened, the space above the piston A1 is exhausted and the piston is raised by the pressure beneath it to close the inlet valve A6 and shut off the supply of gaseous pressure to the outer tube 1. The exhaust valve A2, is, however, closed on its seat A7 as its spring A8 has insufficient thrust to open it against the gas pressure acting on its upper face. The gas in the pipe 1, the chamber 5 and the portion of the pipe 8 below the free piston now expands, falls in pressure as the slug continues to rise up the pipe 8 and flows through the pipe line 38 following the liquid slug to suitable receiving plant and any gas at relatively low pressure flows back past valve A2 to a suitable receiver, the valve A2 being opened automatically by its spring when the downward thrust exerted by the gas pressure above it becomes less than that exerted by the spring.

When the last of the slug has been delivered through the slots 36, the free piston following it up the pipe 35 approaches the end of its upward travel and its head H strikes the buffer pad 96 of a catcher assembly. The pad 96 is located at the lower end of a tube 97 which is slotted to accommodate a cross member 98 of a split crosshead 99 which is urged upwardly by a spring 100 whose ends abut the crosshead and pad carrier. The crosshead 99 carries depending spring blades 101 provided at the lower end with jaws 102 adapted to grip the head H of the free piston when desired. A rod 103 extends from the crosshead 99 up through the tube 97 and through a sealing gland in a tube head 104, the outer end of the rod having a cap 105 capable of being held down by a clip 106 pivotally mounted on the tube head 104. The arrangement is such that when the clip 106 is freed from engagement with the cap 105 the crosshead is raised by its spring to position the jaws 102 as shown in Fig. 3, but when the clip holds down the cap 105, the crosshead 99 is moved downwards in the slots in the tube 97 to position the jaws as shown in Fig. 6. The clip 106 is not normally positioned to hold down the cap 105 and accordingly at the upper end of its travel the head H of the free piston strikes the buffer pad and its kinetic energy is absorbed mainly by the spring 107 while the rise and fall of the head 105 provides externally visible evidence of the arrival of the free piston. If it is desired to secure the free piston at the top of its travel the clip 106 will be engaged over the cap 105 and accordingly when the head H of the free piston strikes the buffer pad 96 the jaws 102 will catch and hold the head.

The third phase of the pump cycle now commences and gas in the pine line 38, flows after the liquid to suitable receiving plant. The absolute pressure of the gas in the pipe 8 which acts on the flexible sheath 69 now diminishes sufficiently to allow the spring 61 in the free piston to raise the piston 60 to engage and raise the collar 58, rods 56, 56a, pistons 52 and 73, tube 75 and the head 76. As a result, the packing 48 is no longer forcibly expanded and retracts to its normal diameter as shown in Fig. 4 to allow the free piston to fall down the pipe by gravity. The light spring 83 is also free to force the lower ends of the dog heads 85 apart ready for automatic re-engagement with the flange 12 when the free piston again enters its socket.

The fourth phase of the pump cycle now commences as the free piston falls down the pipe 8. As it falls, gas must flow past the plunger through the restricted space between one or more restrictor rings such as on the piston body and the inside wall of the pipe 8, the diameter of the restrictor X being such as to offer a resistance to free flow of gas past the free piston as it falls whereby the velocity of the falling free piston may be pre-determined and a too rapid descent prevented.

When the free piston reaches the end of its downward travel it enters its socket, the dog heads 85 automatically engage under the annular flange 12, and the gas by-pass passage 16 is isolated by the sealing rings 94, 95 before the exhaust valve A2 reopens automatically. Gas in the tube 1 during the 4th phase escapes through the auxiliary valve port A3 which is of such a size that the valve A2 will not open before the free piston reaches the socket in the lower end of the eduction pipe. After the free piston reaches the socket and some further reduction of gas pressure has taken place in pipe 1, the valve A2 is automatically opened by its spring, and the remaining gas exhausts more past valve A2 than it did through the port A3 and rapidly reduces the pressure in the tube 1 and lower chamber 5 to permit the refilling of the latter to take place.

In the fifth and last phase of the cycle liquid flows by gravity from the higher liquid level outside the chamber, through the passage 7a past the non-return valve 26 into the chamber 5 ready for a recommencement of the cycle of operations.

Should any fault occur in the free piston mechanism such as breakage of the spring 54, damage to the packer 48, loss of liquid from the space 50 or other contingency resulting in the failure of the free piston to rise to the well surface, the head H of the free piston is adapted to be engaged by a catcher or a "fishing tool" lowered down the inner tube 8 on a wire line. In this case the effect of a pull on the head H by the fishing line will shear the soft metal pin 80 to enable the reciprocating parts in the body above that point to be raised relative to the body of the free piston whereby the head 79 engages the cams 86 to pivot the dogs 81 to withdraw the dog heads 85 from the rib 12 and thereafter an upward pull on the fishing line is transmitted to the body by the collar 58 which also prevents overtravel of the head 79, to lift it up to the well surface.

The foregoing description assumes that the lower chamber 5 is filled with a quantity of liquid more than sufficient for the formation of a normal slug and that the excess liquid is left behind in the chamber 5 when the free piston and slug are raised up the pipe 8.

Assuming now that the input gas pressure is the same as in the foregoing description but that the lower chamber is only half filled with liquid. The curve shown in Fig. 1 during the first phase of the cycle will be virtually the same, the piston 73 will be raised and the piston 60 lowered, as before. When all the liquid in the chamber 5 is displaced into the pipe 8, the flow of liquid through the orifice Va will be succeeded by a flow of gas and the relative viscosities of these two fluids is such that the differential pressure across the orifice created by the gas will be very small compared with that created by the liquid, and will be quite inadequate to hold the piston, 73, in its upper position. The mechanism will therefore be operated by the spring 54 to release the dogs 81 and expand the packer 48 at a point such as indicated by Q on the curve of Fig. 1 and phase 2 of the cycle is commenced as soon as all the liquid in the chamber 5 has been displaced into the pipe 8. The gas pressure under the free piston in this case exceeds the equivalent hydrostatic head represented by the combined weight of the slug and free piston, by a greater amount than would be the case if the quantity of liquid displaced from the chamber were greater and the release of the free piston took place at the point P on the curve.

Further, should the gas pressure applied to the upper surface of the liquid collected in the chamber 5 be lower than usual for any reason, the release point P is reached when a shorter than normal slug has been built up above the free piston and a larger proportion of liquid than usual will therefore be left in the chamber 5 when the free piston is released to travel up the pipe 8. The slug and free piston will, however, travel up the pipe at substantially the normal velocity.

Should the gas pressure applied to the upper surface of the liquid in the chamber 5 be higher than usual, and all the liquid in the chamber displaced into the pipe 8 before the point P is reached, the free piston will be released to ascend the pipe when gas flows through the orifice Va after the last of the liquid. In this case a normal length slug will be raised up the pipe 8 at higher than normal velocity.

It will be seen, therefore, that although the amount of liquid displaced into the pipe 8 and the pressure of the gas acting on the upper surface of the liquid in the chamber 5 may vary within reasonable limits, the slug to be raised may be shorter than normal but cannot be longer than the available gas pressure can raise to the well surface.

Figure 8:
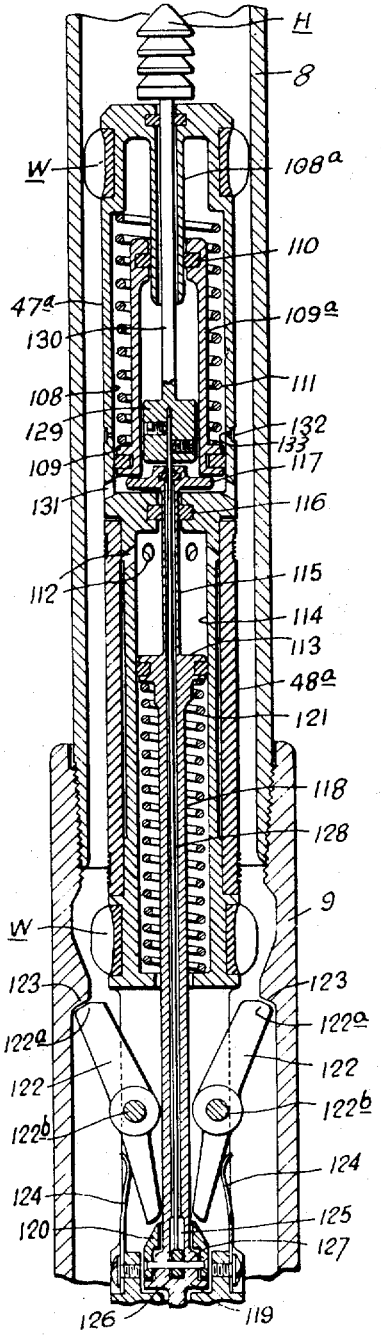
Figs. 8 and 9 show sectional views of the upper and lower halves respectively of a modified form of free piston.
Figure 9:
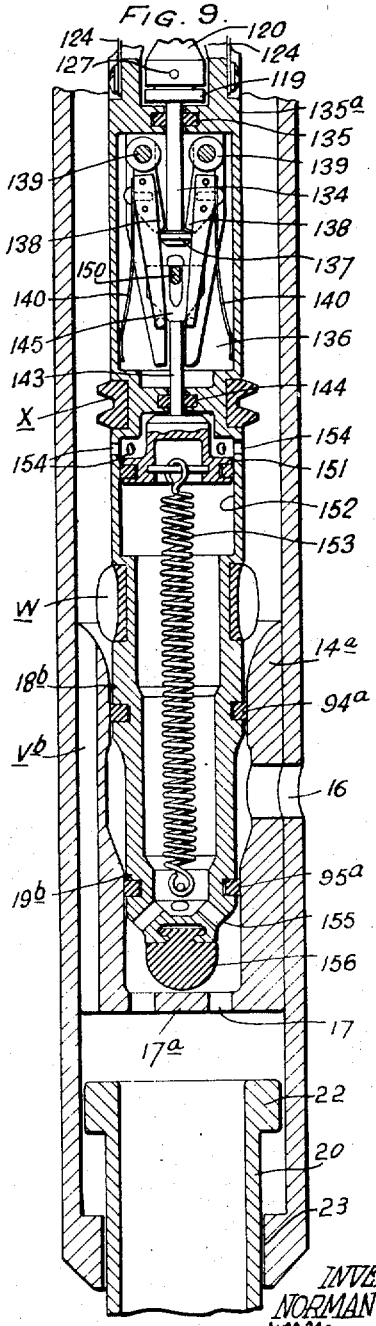

A modified form of free piston is shown in Figs. 8 and 9 which show the upper and lower halves of the modified free piston engaged in its socket at the bottom of the well tubing. As shown in Figs. 8 and 9 the free piston comprises a body 47a having a cylinder 108 and a sleeve 108a which extends into the cylinder. A piston 109 is reciprocably mounted in the cylinder and has a hollow piston rod 109a having a sealing gland 110 which slides over the sleeve 108a. A spring 111 is adapted to urge the piston 109 to its lower-most positions. An annular resilient packer 48a surrounds a portion of the free piston having apertures 112, the opposite ends of the packer being suitably secured, as by wire binding. A piston 113 is slidably mounted in the cylinder 114 which is filled with oil, or other suitable liquid, which is forced through the apertures 112 to expand the packer radially outwards when the piston 113 is raised. A tube 115 extends from the upper face of the piston 113 through a sealing gland 116 into the cylinder 108, the tube 115 having an enlarged head 117 disposed below the piston 109. A tube 118 depends from the underface of the piston 113, its bore communicating with that of the tube 115 through an aperture in the piston 113. The lower end of the tube 118 is connected with a flange 119 supporting a conical head 120. A spring 121 is provided adapted to exert an upward thrust on the piston 113. Dogs 122 having heads 122a are pivotally mounted at 122b in a slotted portion of the free piston body, the heads 122a being adapted to engage the shoulder 123 in the socket to hold the free piston, blade springs 124 being provided to urge the dogs to engaging position. The lower end of the tube 118 has slots 125 through which extends a reciprocating crosshead 126 which engages in a recess inside the conical head 120. A soft metal shear pin 127 holds both the head 120 and the crosshead 126 in their downmost or normal position. The crosshead is connected with a wire 128 which extends up within the tubes 118, 115 and is clamped to the head 129 of a rod 130 which extends up the sleeve 108a to the fishing head H of the socket. The cylinder 108 has holes 131 below the lowermost position of the piston 109 to admit well fluids. A resilient ring 132 of synthetic rubber or like material covers a series of apertures 133 to serve as a one-way valve to compensate for any small leakage of fluids into the cylinder 108 past the various sealing glands substantially as described with reference to the apertures 67 and rings 68 of Fig. 4.

A trigger rod 134 extends downwardly from the flange 119 through a seal 135 in the body part 135a into a trigger chamber 136 formed within the free piston body. The rod 134 has a trigger head 137 the upper face of which is adapted to engage under detents 138, pivoted on pins 139, and urged inwardly by blade springs 140. Blade springs 141 are secured to the opposite sides of each detent 138, each blade being fitted with a button 142. The buttons on the respective pairs of blades face inwardly and are slightly spaced apart (Fig. 10).

A rod 143 extends into the trigger chamber through a seal 144, the upper end of the rod being connected with a cam member 145 (Fig. 10) which comprises sloping portions 146, 147 (Fig. 10) so arranged that when the cam 145 is raised, its upper edge enters the gaps between the pairs of buttons 142 and the blade springs 141 separate to permit the cam 145 to pass without the blade springs and the detents 138 carried thereby being forced to swing outwardly. After the cam 145 has passed, the buttons spring under the sloping faces 147. However, if the cam 145 is then moved downwardly the opposed sloping faces 147 will engage the pairs of buttons 142 and, owing to the comparative edgewise stiffness of the blade springs 141, the cam will cause the opposed pairs of blade springs and the detents 138 carried thereby to be swung outwardly away from one another, to release the trigger head 137.

The detents 138 are pivotally mounted on spaced plates 148 depending from the body portion 135a, the plates having slots 149 into which slide cross arms 150 on the cam 145 which serve to centralise the cam relative to the blades 141 and buttons 142.

The trigger chamber 136 is only partially filled with oil in this construction, leaving an enclosed cushion of gas to accommodate the displacement of the reciprocating rods 134, 143.

The lower end of the rod 143 is connected with a piston 151 reciprocable in a cylinder 152 and provided with a spring 153 adapted to exert a downward pull on it. Apertures 154 are formed in the cylinder 152 above the piston 151 and passages 155 are provided at the lower end of the cylinder. The bottom of the free piston has a buffer pad 156 and sealing rings 94a, 95a are provided engaging in different diameter bores 18b, 19b of the socket to isolate the by-pass gas passage 16, substantially as described in relation to Figs. 4 and 5.

Parts of socket having similar reference numerals are substantially identical with the socket in Fig. 5 but in Fig. 9 the arrangement of the orifice is different and instead of it being formed by orifices in the resilient ring 96 carried by the free piston, this ring is dispensed with and the orifice is formed by the restricted passage Vb through which the liquid to form the slug is constrained to flow as it is displaced from the chamber 5. As the liquid flows through the restricted orifice Vb a differential pressure is created across it, the higher of "upstream" pressure acting through the openings 17 in the base of the socket and openings 155 in the free piston, on the underside of the piston 151, and the lower or downstream pressure acting through the holes 154 on the upper side of this piston. As shown the well fluids act directly on the opposite sides of the piston but if desired a sheath or sheaths such as 69 may be provided to transmit the pressure of the well fluids while keeping the piston from direct contact with them.

As shown, the free piston is at rest and secured in its socket by the dogs 122. As during the last phase of the pump cycle the pressure at the holes 131 is low and approximately the same as the pressure existing in the cylinder 108, the spring 111 having a greater thrust than the spring 121 forces down the piston 109 which engages the head 117, and in forcing down the tube 115 and piston 113 compresses the spring 121 to the position shown in Fig. 8. The conical head 120 is below the ends of the dogs 122, the heads 122a of which are swivelled outwardly by the springs 124 to engage under the shoulders 123. As the piston 113 is in its lowermost position the packer 48a is contracted to substantially the diameter of the free piston body. The trigger head 137 is held down by the detents 138 but the piston 151 would not be in the position shown, but would be held down at the bottom of the cylinder 152 by its spring 153 whereby the cam member 145 is positioned beneath and clear of the buttons 142.

During phase one of the pump cycle, liquid displaced from the chamber 5 and flowing up through the orifice Vb sets up a differential pressure across the orifice which raises the piston 151 against the pull of the spring 153, and the cam 145 is raised past the buttons 142 to the position shown in Fig. 9 without disengaging the detents 138 from the trigger head 137. As a slug of liquid is built up in a column in the pipe 8 above the free piston, the absolute pressure due to the liquid column rises and this pressure is transmitted through the holes 131 to raise the piston 109 clear of the head 117 on the tube 115 leaving the piston 113 free to be forced up by its spring 121 as soon as the trigger mechanism is released. As phase 1 continues the differential pressure across the orifice Vb falls to the point P on the graph of Fig. 1, when the slug above the free piston has reached the appropriate length, or when the differential pressure falls prematurely from a point such as Q if all the liquid available in the chamber 5 has been displaced and gas follows the last of the liquid through the orifice Vb. In either of these cases the differential pressure acting upwards on the piston 151 is no longer sufficient to hold up the piston which is accordingly forced down by its spring 153. Cam 145 is accordingly pulled down and effects the separation of the detents 138 to free the trigger head 137. The trigger rod is then free to rise and spring 121 raises its piston 113 and with it the head 120 which engages and swivels the dogs 122 about their pivot 122b to disengage them from the shoulders 123 in the socket. The piston 113 in rising forces the liquid above it, through apertures 112 to act on the inner surface of the packer 48a to expand it radially to make sliding sealing engagement with the wall of the pipe 8 and the free piston then commences to travel up beneath the liquid slug. As previously described, once the free piston leaves its socket gas entering the by-pass passage 16 acts on the cross-sectional area of the free piston to lift it and the slug to the wall surface.

The free piston in this embodiment of the invention may be raised, when necessary by a "fishing device" adapted to engage the head H. In this embodiment when a fishing line engages the head and an upward pull is applied, the wire 128 is raised and the pin 127 sheared. Upward movement of the cross-head 126 then [raise 5] *raises* the conical head 120 to engage and move the lower ends of the dogs 122 apart and thereby disengage the dog heads 122a from the shoulder 123 in the socket without requiring the release of the trigger mechanism. The free piston can then be lifted to the well surface by the fishing line.

A further modified form of free piston is shown in Fig. 11. In this figure only the upper part of the free piston is shown as the mechanism below the dogs 122 is substantially identical with that shown in Figs. 8 and 9. In Fig. 11, the packer 48b is adapted to be expanded and retracted mechanically, instead of by hydraulic means. The packer 48b, as in the other embodiments, comprises an annular resilient sleeve. The upper end of the packer is secured to the free piston body and its lower end secured to a sleeve 156 connected by pins 157 with a collar 158 on a tube 159 extending upwardly of the portion of the free piston body carrying the packer. The apertures for the pins 157 are covered by a seal 157a. The upper end of the tube 159 has a flange 160 engaged by a coil spring 161 tending to urge the tube 159 upwardly from the position shown in Fig. 11. As soon as the trigger mechanism previously described is released, the tube 159 is raised by the spring 161, and in rising frees the dogs 122 and lifts the sleeve 156 to apply an axial upwardly directed force to the lower end of the packer 49b causing it to expand radially outwards. A further modification of the free piston according to Fig. 11 is that the absolute pressure piston mechanism of the two embodiments previously described is omitted. In the construction shown in Fig. 11, the arrangement is such that when the free piston arrives at the top of the tube 35 its velocity is such that the head H strikes the buffer pad 96 (Fig. 3) with such momentum that the free piston head H is forced down into the free piston body, the spring 107 being stronger than the spring 161, in the free piston. The kinetic energy of the upwardly moving piston when it strikes the pad 96 is accordingly utilized to effect the depression of the tube 159, load the spring 161 and reset the trigger mechanism. The means for raising the free piston by a "fishing" line is similar to that described with reference to Figs. 8 and 9 except that the upper end of the wire 128a is secured to the head H.

Figure 13:
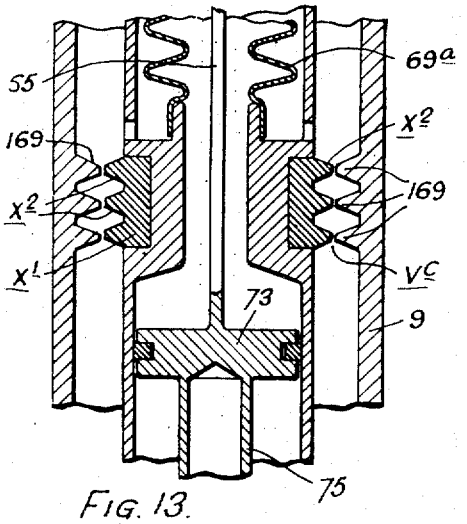
Figs. 12 and 13 are sections of parts of free pistons showing still further modifications.
Figure 12:
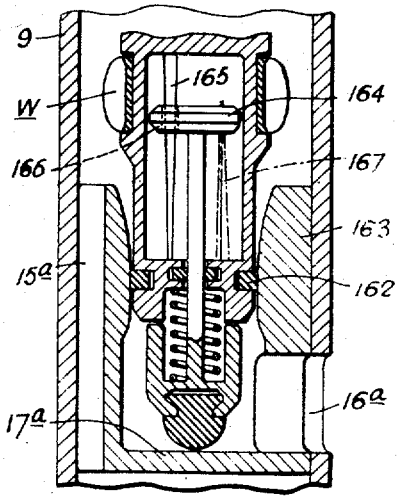

A further modified form of free piston and socket therefor is shown in Fig. 12 and is particularly intended for use in a displacement pumping system where the gas pressure for raising the slug up the well is relatively low and the slug is accordingly raised to the well surface at relatively low velocity. In this arrangement the base 17a of the socket is not provided with axial passages 17 as in Figs. 5 and 9 and the lower end of the free piston has only a single sealing ring 162 for engaging the socket portion 163. This socket portion has axial passages 15a and a gas by-pass passage 16a. Modified shock absorber means are also shown in Fig. 12 and comprises a piston 164 and means providing a diminishing flow passage for oil past it as it is forced upwardly in the cylinder. These means comprise one or more tapered pins 165 extending through a hole 166 in the piston 164. Alternatively tapered grooves 167 on the inner wall of the cylinder 168 may be provided as shown in dotted lines. Fig. 13 shows a modified arrangement of orifice for creating the differential pressure to actuate the mechanism in the free piston and as shown, the free piston is provided with a ring X′ of resilient material similar to the restrictor X of Fig. 4 and formed with a series of annular ridges X2 and the socket portion is formed with a corresponding series of ridges 169. When the free piston is held in the socket the ridges X2 and 169 are in alignment and an annular orifice Vc is formed between their free ends. The ring X′ is adapted to serve the dual purpose of acting as means of limiting the velocity of the free piston as it falls down the well tubing against an uprising flow of gas in the pipe 8 and also, when the free piston is in the socket to cooperate with the ridges 169 to form a restricted orifice for the flow of fluids up past the free piston. It will be understood that the shape of the cooperating parts on the free piston and socket forming the orifice Vc may be varied. As shown in Fig. 13 a series of three axially spaced orifices are provided which produce a cumulative drop in pressure in three stages.

Fig. 13 also shows a modified form of sheath to that shown in Figs. 4 and 5 in that the sheath 69a in Fig. 13 has radial corrugations instead of the axial corrugations of the sheath 69 of Figs. 4 and 5.

Figure 14:
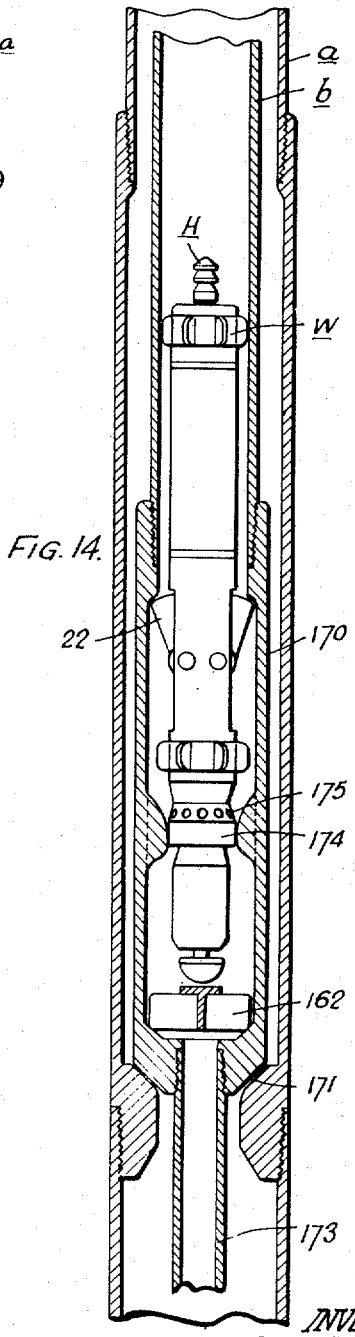
Fig. 14 shows a suitable form of sub-surface equipment adapted for using a free piston with a closed tube displacement pumping system such as described in my prior U. S. patent specification No. 2,162,418.

The arrangement shown diagrammatically in Fig. 14 comprises an outer tubing a and a reciprocating inner tubing b such as used in a "closed tube" displacement pumping system as described in prior U. S. Patent No. 2,162,418. In this arrangement a housing 170 is provided at the lower end of the reciprocating inner tubing b. When the tubing b is at the bottom of its stroke the housing 170 is located relative to the other sub-surface equipment by a collar 171 and contains a cross winged buffer plate 162. The lower end of the tube b is connected with the displacement chamber by a pipe 173 and the restricted orifice is provided by a ring 174 having axial passages 175. Alternatively the restricted orifice may be provided by an orifice similar to Vb shown in Fig. 9 or may be formed by cooperating parts on the free piston and socket as described with reference to Fig. 13. It will be noted that in this embodiment of the invention the gas by-pass 18, and the sealing rings 94, 95 are omitted. The free piston may however, embody an expanding packer and mechanism, as described in any of the various embodiments previously described.

Figure 15:
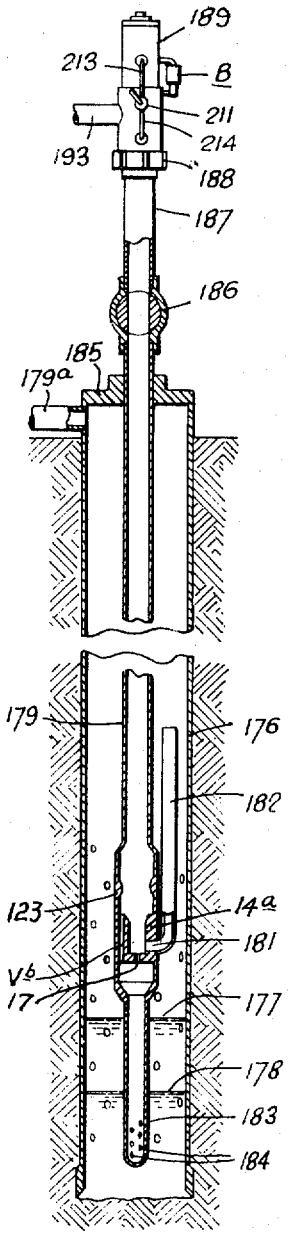
Figs. 15 and 16 illustrate sub-surface and surface apparatus particularly for use with free pistons, as shown in Fig. 9.
Figure 16:
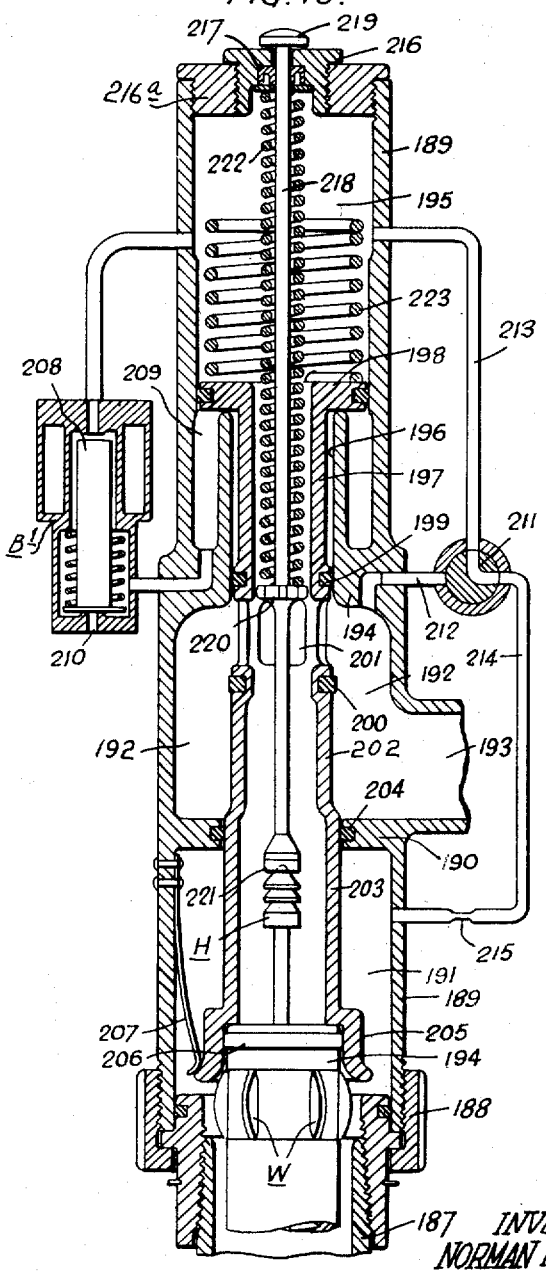

Referring to Figs. 15 and 16 these illustrate an arrangement for use in wells in which gas pressure in the casing 176 is normally kept high enough to be used effectively in raising oil slugs. As shown diagrammatically in Fig. 15 the well casing is indicated by 176 and the normal limits of the liquid variations are indicated by 177 and 178 respectively. An inner tube 179 is provided having a housing portion to receive a free piston. The housing here shown is similar to that shown in Figs. 8 and 9 and the free piston is similar to that shown in Figs. 9 and 11, but in this arrangement lateral gas by-passage 16 is connected with a pipe 182 extending upwardly above the highest expected liquid level in the well to ensure that the gas flowing through the passage 16 will be substantially free of liquid. The lower end of the socket has an extension 183 depending below the lowest level of liquid in the well casing and is formed with perforations 184 providing a screened entry for the well liquid. The tubing 179 extends through a well head casing 185 and is provided with a full-bore valve 186. A pipe 187 of a length at least that of the axial length of the free piston extends above the valve 186 and is clamped by a screw ring 188 to a valve body generally indicated 189.

As shown in Fig. 16 the valve body 189 has an internally extending flange 190 separating a lower cavity 191 from a central cavity 192 provided with a fluid flow outlet 193 connected with a delivery line (not shown) leading to suitable fluid receiving plant (not shown). A second flange 194 separates the central cavity 192 from an upper cylinder 195 and extends upwardly to form a cylinder 196. A reciprocating sleeve is provided having an upper portion 197 and a piston 198 adapted to engage the wall of the cylinder 195. The sleeve is also provided with sealing rings 199 and 200, a slotted portion 201, a central sleeve portion 202 and a lower sleeve portion 203 adapted for sliding engagement through the sealing ring 204, and a socket portion 205 adapted to receive the top of the free piston. The top of a free piston which will be substantially as shown in Fig. 11 but is provided with a sealing ring 206 adapted to engage and seal in the socket portion 205. The outside diameter of the lower sleeve 203 is not larger than the bore of the socket 205 and the respective outside diameters of the central and upper sleeve portions 202, 197 and slotted portion 201 are smaller than that of the lower sleeve portion 203. One or more blade springs 207 are provided in the cavity 191 and adapted to provide resilient stop means adapted to engage the outer rim of the socket 205. A valve unit B′ is provided which is of the remote controlled electro-magnetic type but which may be controlled by known clockwork of pneumatic mechanisms if desired. The armature 208 is normally urged into the position shown in Fig. 16 by its spring to maintain a connection through the valve between the cavities 209 and cylinder 195 and when raised by energisation of the electro-magnet, closes the passage to the cylinder 195 and connects the cavity 209 with atmosphere via the exhaust port 210. A small hand-operated three-way valve 211 is provided at the junction of pipes 212, 213, 214. In normal working position, shown in Fig. 16 the valve is positioned to close the pipe 212 and connect pipes 213, 214 the latter pipe having a needle valve or the like 215. The valve body has a cap 216 fitted with a gland 217, through which extends a reciprocating rod 218 having a head 219, a collar 220 and a buffer head 221. The rod 218 is normally held in its lowermost position by a spring 222 which when in its extended position has a thrust greater than that of the spring 161 of the free piston (Fig. 11) in the loaded condition. The arrangement is such that with the sleeve in its lowermost position, the head H of the free piston, on reaching the well surface, contacts the buffer head 221 when the sealing ring 206 of the free piston is entered into the bore of the socket 205. An additional buffer spring 223 is adapted to contact the end plug 216a after the sealing ring 200 has been raised to enter the cylinder 196, after which further upward travel of the sleeve is possible by compressing the springs 223 and 222.

Assuming that the well and apparatus are generally as shown and described with reference to Figs. 15, 16 with the level of liquid at 177 and a gas pressure of say 75 lb./sq. in. in the well casing above the liquid and assuming that a free piston substantially as shown in Figs. 11 and 9 but with an "orifice" as shown in Fig. 13 is located in the socket at the bottom of the pipe 179 and retained by the dogs 122 engaging the annular ring 123. At this stage the sleeve 197 is, in its uppermost position and the slotted portion 201 is located within the cylinder 196 and is isolated therein by the sealing rings 199, 200. The cavity 192 and flow line 193 will be at relatively low pressure. The cavities 209 and 191 and cylinder 195, the pilot valve B′, the tubes 179, 187 and the well casing are all filled with gas at 75 lb./sq. in. and the pilot valve armature 208 is in the position shown.

With parts in the position described the pilot valve B′ is actuated to open the exhaust port 210 and close the passage to the cylinder 195 thereby exhausting the cavity 209 to atmosphere whereupon the sleeve 197 is thrust downwards by the internal pressure acting on the piston 198 which has a larger area than that of the seals 199, 200. With the sleeve in lowered position, the slotted portion 201 is withdrawn from the cylinder 196 and gas now flows out of the pipe 179 to the outlet 193 and as soon as the pressure in the cavities 191, 192 and cylinder 195 and in the valve B′ reaches a low and approximately equal pressure, the valve 208 is returned to its "at rest position" as shown, once more closing the exhaust port 210 and opening the connection between the cylinder 195 and cavity 209.

Simultaneously there is a rapid fall in the pressure of gas in the pipe 179 above the free piston, and this permits the casing gas pressure acting on the surface 177 of the liquid to displace liquid up the pipe 183 through the orifice passage Vb (Fig. 13) to build up a slug of liquid above the free piston in the pipe 179. As the liquid flows through the orifice Vb a differential pressure across the orifice is set up which has the characteristic of the curve shown in Fig. 1. When the hydrostatic equivalent of the liquid slug has increased until it is say 5 lb./sq. in. less than the pressure below the orifice Vb, this representing the vertical height of the point P, above the base line of the curve of Fig. 1, the mechanism in the free piston is actuated as previously described and the dogs are withdrawn, the packing member of the free piston expanded and the 5 lb./sq. in. pressure difference acting beneath the free piston forces it out of its socket 14a and up the pipe 179. Immediately the free piston leaves the socket 14a, the by-pass passage 16 is opened and gas flows down the pipe 182 through the passage 16 and lifts the free piston and slug up the pipe 179. Before the passage 181 is opened the liquid level in the well casing is depressed to approximately the level 178 and the pressure of the liquid acting on the lower end of the orifice Vb is substantially 75 lb./sq. in. minus the hydrostatic equivalent of a liquid column extending from the level 178 to the lower end of the orifice. After the by-pass 16 is opened, however, the gas pressure available through the pipe 182 and applied to lift the free piston, is the full 75 lb./sq. in.

When the slug of liquid reaches the surface it flows through the slots in the portion 201 into the outlet 193, preceded by the gas which was above the slug in the pipe 179. Any tendency for the sleeve to rise, due to resistance to fluid flow through it, is checked by the spring blades 207 acting on the outer rim of the socket portion 205.

When the free piston arrives at the surface, its head enters the sleeve and the sealing ring 206 engages in the socket 205. The liquid slug flowing through the outlet 193 has sufficient momentum to create a temporary low pressure throughout the interior of the sleeve above the free piston and as the pressure beneath the free piston is high, the sleeve is forced upwards overcoming the resilient stop provided by the spring blades 207. The head H of the free piston contacts the buffer head 221 and its further upward movement is resisted by the spring 222. As the upward thrust of the free piston due to the 75 lb./sq. in. gas pressure beneath it with low pressure above it and the kinetic energy of the moving free piston, is greater than the thrust of the spring 161 in the free piston, the head H will be depressed to force the tube 159 down relatively to the body of the free piston whereby spring 161 will be loaded and held loaded by the detents 138 engaging the head 137 at the lower end of the rod 134, further the packing member 48b is retracted.

If the kinetic energy of the free piston is not all absorbed in loading the spring 161, the remainder is absorbed by compression of springs 222, 223.

The cylinder 195 is now at a pressure lower than the 75 lb./sq. in. in the pipe 179 and the free piston is held up in the socket 205 pneumatically. The pressure in the cylinder 195 commences to be built up by the flow of gas through the choke 215 and pipes 214 and 213 and when the pressure in cylinder 195 approaches its higher value the free piston is no longer supported pneumatically and drops out of its socket by gravity and falls down the pipe 179.

After the free piston leaves the socket 205 the sleeve is held in its uppermost position due to the difference between the high pressure inside the sleeve and lower pressure outside it, in the cavity 192, acting on the difference between areas of the sealing rings 200, 204.

At the commencement of the descent of the free piston, the pipe 179 contains a static column of gas at 75 lb./sq. in. Owing to the effect of the restrictor ring X, the fall of the free piston causes a drop in the pressure of gas above the free piston. At the end of its descent the free piston enters its socket and re-closes the by-pass passage 16.

When it is desired to remove the free piston, for examination, repair or replacement, the three-way valve 211 is turned to shut off the pipe 214 and establish a connection between the cylinder 195 and central cavity 192 through pipes 212, 213. Accordingly when the free piston arrives at the surface and enters the socket 205 it raises the sleeve. The pneumatic pressure holding up the free piston is now preserved as the flow line is at low pressure and the cylinder 195 is kept at the same low pressure. The arrival of the free piston is indicated by the externally visible upward movement of the head 219 and to obtain access to the free piston the valve 186 is closed and the ring 188 unscrewed to permit the removal of the valve body 189 and free piston.

In wells where the gas normally coming out of solution in the well liquid is more than sufficient to raise all the available liquid by the foregoing method, excess gas is taken off through the connection 179a; if conditions are such that the natural gas available in the well is insufficient in quantity it may be supplemented by gas from a suitable source delivered through the same pipe 179a.

If a well is over-produced and the liquid level falls below the level 178 to the lower end of pipe 183 before a normal slug is built up above the free piston gas will enter the pipe 183 and succeed liquid flowing through the orifice Vb during phase one of the pump cycle before the point P on the curve in Fig. 1 is reached and the free piston will be released immediately from a point such as Q as previously described.

It will be noted that each of the free pistons shown in the accompanying drawings is provided with one or more sets of wing guides W the object of which is to centralise the free piston as it ascends and descends the pipe. The guides may, however, be also adapted to serve as scrapers for removing wax deposits on the inside of the pipe in which the free piston operates. These wing guides may be made of synthetic rubber or metal.

I claim:

1. [An] *In* apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, means for supplying gaseous pressure to displace well fluids from said chamber into said pipe to build up a slug of liquid above said free piston, and orifice through which said well fluids are constrained to flow when they are displaced from said chamber to build up said slug, and means responsive to a predetermined change in the differential pressure across said orifice created by the well fluids flowing therethrough to effect the release of said holding means and release the free piston to travel up said eduction pipe, and means for supplying gaseous pressure beneath said free piston to raise it and the slug formed above it up said eduction pipe to the well surface.

2. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, an abutment adjacent to the lower end of said pipe, a free piston adapted to travel up and down inside said pipe, means on said free piston operable automatically to engage said abutment to secure said free piston to said pipe when said free piston reaches the limit of its downward travel, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined change in the differential pressure across said orifice created by the well fluids flowing therethrough to effect the release of said means on said free piston from said abutment to release the said free piston to travel up said eduction pipe, and means for supplying gaseous pressure beneath said free piston to raise it and the slug formed above it up said eduction pipe to the well surface.

3. In apparatus for raising liquid in wells by gaseous pressure, a vertical liquid eduction pipe, a free piston adapted to travel up and down inside said pipe, means for automatically holding said free piston at the lower end of said pipe when said piston reaches the limit of its downward travel, means for supplying gaseous pressure to displace well fluids into said pipe to build up a slug of liquid above said free piston, an orifice through which said well fluids are constrained to flow to build up said slug, and means responsive to a predetermined change in the differential pressure across said orifice created by the well fluids flowing therethrough to effect the release of said holding means and release the free piston to travel up said eduction pipe, and means for supplying gaseous pressure beneath said free piston to raise it and the slug formed above it up said eduction pipe to the well surface.

4. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said pipe when said piston reaches the limit of its downward travel, means for supplying gaseous pressure to displace well fluids from said chamber into said pipe to build up a slug of liquid above said free piston, an orifice through which said well fluids are constrained to flow when they are displaced from said chamber to build up said slug, an auxiliary piston reciprocably mounted in said free piston, and means responsive to a predetermined change in the differential pressure across said orifice created by the well fluids flowing therethrough to actuate said auxiliary piston to effect the release of said holding means and release the free piston to travel up said eduction pipe, and means for supplying gaseous pressure beneath said free piston to raise it and the slug formed above it up said eduction pipe to the well surface.

5. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, means for supplying gaseous pressure to displace well fluids from said chamber into said pipe to build up a slug of liquid above said free piston, an orifice through which said well fluids are constrained to flow when they are displaced from said chamber to build up said slug, an auxiliary piston reciprocably mounted in said free piston and adapted to be raised within said free piston upon an increase in the differential pressure created across said orifice by well fluids flowing therethrough as said slug is built up in said eduction pipe, and spring means operative to depress said auxiliary piston upon a reduction in said differential pressure to effect the release of said holding means and release the free piston to travel up said eduction pipe, and means for supplying gaseous pressure beneath said free piston to raise it and the slug formed above it up said eduction pipe to the well surface.

6. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, means for supplying gaseous pressure to displace well fluids from said chamber into said pipe to build up a slug [or] *of* liquid above said free piston, an orifice through which said well fluids are constrained to flow when they are displaced from said chamber to build up said slug, said free piston comprising a hollow body portion, an auxiliary piston reciprocably mounted in said hollow body portion, spring means for moving said auxiliary piston in one direction, means for moving said auxiliary piston in the opposite direction against the action of said spring in accordance with a rise in the differential pressure created across said orifice as the well fluids flow therethrough to build up said slug in eduction pipe, and means permitting the actuation of said piston by said spring means upon a reduction in said differential pressure to effect the release of said holding means and release the free piston to travel up said eduction pipe, and means for supplying gaseous pressure beneath said free piston to raise it and the slug formed above it up said eduction pipe to the well surface.

7. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, a socket at the lower end of said eduction pipe to receive said free piston when it reaches the limit of its downward travel, means for automatically securing said free piston when it enters said socket, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined decrease in the differential pressure across said orifice created by the well fluids flowing therethrough to effect the release of said holding means and release the free piston to travel up said eduction pipe, and means for supplying gaseous pressure beneath said free piston to raise it and the slug formed above it up said eduction pipe to the well surface.

8. In apparatus for raising liquid in wells by gaseous pressure, a vertical liquid eduction pipe, a displacement chamber adjacent to the lower end of said eduction pipe for collecting fluids from the well, a free piston adapted to travel up and down inside said pipe, a socket at the lower end of said pipe to receive said free piston when it reaches the limit of its downward travel, abutment means in said pipe adjacent to said socket, means on said free piston automatically engaging said abutment means to secure said free piston in said socket, an axial passage in said socket, means for supplying gaseous pressure to displace well fluids from said chamber through said axial passage into said pipe to build up a slug of liquid above said free piston, and means responsive to a predetermined change in the differential pressure created by the well fluids flowing through said axial passage to effect the release of said means on the free piston from said abutment means in said pipe and release the free piston to travel up said eduction pipe, and means for supplying gaseous pressure beneath said free piston to raise it and the slug formed above it up said eduction pipe to the well surface.

9. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, a resilient sleeve surrounding part of said free piston, means for automatically holding said free piston at the lower end of said pipe when said piston reaches the limit of its downward travel, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined decrease in the differential pressure across said orifice created by the well fluids flowing therethrough to effect the release of said holding means and release the free piston to travel up said eduction pipe and to expand said resilient sleeve to make sliding sealing engagement with said pipe, and means for supplying gaseous pressure beneath said free piston to raise it and the slug formed above it up said eduction pipe to the well surface.

10. Apparatus as claimed in claim 9 comprising hydraulically actuated means for effecting the radially outward expansion of said sleeve substantially simultaneously with the release of said holding means.

11. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, a resilient sleeve surrounding part of said free piston, means for automatically holding said free piston at the lower end of said pipe when said piston reaches the limit of its downward travel, means for supplying gaseous pressure to displace well fluids from said chamber into said pipe to build up a slug of liquid above said free piston, an orifice through which said well fluids are constrained to flow when they are displaced from said chamber to build up said slug, an auxiliary piston reciprocably mounted in said free piston and means responsive to a predetermined decrease in the differential pressure across said orifice created by the well fluids flowing therethrough to actuate said auxiliary piston to effect the release of said holding means and release the free piston to travel up said eduction pipe and to expand said resilient sleeve to make sliding sealing engagement with said pipe and means for supplying gaseous pressure beneath said free piston to raise it and the slug formed above it up said eduction pipe to the well surface.

12. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, said free piston having a hollow body portion, a rod slidably mounted in said body portion, a spring adapted to actuate said rod, detent means for holding said rod against movement relative to said body portion with the said actuating spring in loaded condition, an auxiliary piston reciprocably mounted in said hollow body portion means connected with said auxiliary piston for releasing said detent means, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined change in the differential pressure across said orifice created by the well fluids flowing therethrough to actuate said auxiliary piston to release said detent means and free said rod to be actuated by its spring to effect the release of said holding means and release the free piston to travel up said eduction pipe, and means for supplying gaseous pressure beneath said free piston to raise it and the slug formed above it up said eduction pipe to the well surface.

13. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, said free piston having a hollow body portion, a rod slidably mounted in said body portion, a spring adapted to actuate said rod, detent means for holding said rod against movement relative to said body portion with the said actuating spring in loaded condition, an auxiliary piston reciprocably mounted in said hollow body portion, means connected with said auxiliary piston for releasing said detent means, a resilient sleeve surrounding part of said hollow body portion, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined change in the differential pressure across said orifice created by the well fluids flowing therethrough to actuate said auxiliary piston to release said detent means and free said rod to be actuated by its spring to effect the release of said holding means and release the free piston to travel up said eduction pipe and to effect the outward radial expansion of said sleeve to make sliding sealing engagement with the said eduction pipe, and means for supplying gaseous pressure beneath said free piston to raise it and the slug formed above it up said eduction pipe to the well surface.

14. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, said free piston having a hollow body portion, a rod slidably mounted in said body portion, a spring adapted to actuate said rod, detent means for holding said rod against movement relative to said body portion with the said actuating spring in loaded condition, an auxiliary piston reciprocably mounted in said hollow body portion, means connected with said auxiliary piston for releasing said detent means, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined change in the differential pressure across said orifice created by the well fluids flowing therethrough to actuate said auxiliary piston to release said detent means and free said rod to be actuated by its spring to effect the release of said holding means and release the free piston to travel up said eduction pipe, means on said rod for applying a force axially of said sleeve to produce a radial outward expansion thereof, and means for supplying gaseous [preesure] *pressure* beneath said free poston to raise it and the slug formed above it up said eduction pipe to the well surface.

15. Apparatus as claimed in claim 12 wherein means are provided for depressing the said rod relative to the free piston to re-engage said detents and load said actuating spring, each time said free piston arrives at the upper limit of its travel up said eduction pipe.

16. Apparatus as claimed in claim 12 wherein said rod is provided with an extension projecting from the upper end of said free piston, an abutment at the upper end of said pipe engageable by said extension when said free piston arrives at the upper limit of its travel up said eduction pipe, whereby the kinetic energy of said upwardly moving piston is utilized to effect the depression of said rod by said abutment to load the said actuating spring and effect the re-engagement of the detents to hold said rod in depressed position.

17. A free piston adapted for upward and downward travel inside a vertical liquid eduction pipe of apparatus for raising liquid up said pipe by gaseous pressure, said free piston comprising a hollow body portion, a resilient sleeve surrounding part of said body portion, means on said body portion for automatically securing said free piston at one position in said pipe, means located within said hollow body portion for effecting the release of said securing means and hydraulically actuated means also located in said hollow body portion for expanding said resilient sleeve radially outwardly.

18. A free piston adapted for upward and downward travel inside a vertical liquid eduction pipe of apparatus for raising liquid up said pipe by gaseous pressure, said free piston comprising a hollow body portion, a resilient sleeve surrounding part of said body portion, means on said body portion for automatically securing said free piston at one position in said pipe, means located within said hollow body portion for effecting the release of said securing means and means also located in said hollow body portion for applying a thrust axially of said resilient sleeve to expand the same radially outwardly.

19. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, a socket at the lower end of said eduction pipe to receive said free piston when it reaches the limit of its downward travel, means for automatically securing said free piston when it enters said socket, means for supplying gaseous pressure to displace well fluids from said chamber into said pipe to build up a slug of liquid above said free piston, an annular resilient member surrounding part of the outer surface of said free piston and adapted to make sealing engagement with said pipe when said free piston is entered into said socket, at least one axial passage in said annular member forming an orifice through which said well fluids are constrained to flow when they are displaced from said chamber to build up said slug, and means responsive to a predetermined decrease in the differential pressure across said orifice created by the well fluids holding means and release the free piston to travel up said eduction pipe, and means for supplying gaseous pressure beneath said free piston to raise it and the slug formed above it up said eduction pipe to the well surface.

20. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, a socket at the lower end of said eduction pipe to receive said free piston when it reaches the limit of its downward travel, means for automatically securing said free piston when it enters said socket, means for supplying gaseous pressure to displace well fluids from said chamber into said pipe to build up a slug of liquid above said free piston, an annular projection on the inner surface of said pipe adjacent to said socket, said annular member and annular projection being adapted to be aligned but spaced radially to form an axial passage therebetween when said free piston is entered into said socket, the said axial passage constituting an orifice through which said well fluids are constrained to flow when they are displaced from said chamber to build up said slug, and means responsive to a predetermined decrease in the differential pressure across said orifice created by the well fluids flowing therethrough to effect the release of said holding means and release the free piston to travel up said eduction pipe, and means for supplying gaseous pressure beneath said free piston to raise it and the slug formed above it up said eduction pipe to the well surface.

21. In apparatus for raising liquid in wells by gaseous pressure, a liquid eduction pipe, a displacement chamber adjacent to the lower end of said pipe for collecting fluids from the well, conduit means connecting said chamber with the lower end of said pipe with said chamber, a free piston adapted to travel up and down inside said pipe, arms pivotally mounted on said free piston, spring means urging said arms outwardly of said free piston, abutments located at the lower end of said pipe for automatic engagement by said arms when said free piston reaches the lower limit of its downward travel in said pipe, means for supplying gaseous pressure to displace well fluids from said chamber into said pipe to build up a slug of liquid above said free piston, a passage through which said well fluids are constrained to flow when displaced from said chamber into said pipe, means responsive to a predetermined reduction in the differential pressure created by said well fluids flowing through said passage, to effect an inward movement of said pivoted arms to disengage them from said abutments and release the piston to travel up said pipe beneath a slug of liquid formed above it in said pipe.

22. In apparatus for raising liquid in wells by gaseous pressure, a vertical liquid eduction pipe, a displacement chamber adjacent to the lower end of said eduction pipe for collecting liquid from the well, conduit means connecting said chamber with the lower end of said pipe, a socket located in the lower end of said pipe, a free piston in said socket, means on said free piston holding it in said socket, a passage extending axially within said pipe, means for supplying gaseous pressure to displace well liquid from said chamber through said axial passage into said pipe, a cylinder formed in said free piston, an auxiliary piston reciprocably mounted in said cylinder, a port in said cylinder connecting the space above said auxiliary piston with well fluids at the upper end of said axial passage, a second port connecting the space in said cylinder beneath said piston with well fluids at the lower end of said axial passage, said auxiliary piston being actuated to effect the release of said free piston from said socket by the differential pressure created by well fluids flowing through said axial passage and acting on opposite sides of said auxiliary piston through said ports, and means for supplying gaseous pressure beneath said free piston to raise it up the said eduction pipe.

23. In apparatus for raising liquid in wells by gaseous pressure, a vertical liquid eduction pipe, a displacement chamber adjacent the lower end of said eduction pipe for collecting liquid from the well, conduit means connecting said chamber with the lower end of said pipe, a socket located in the lower end of said pipe, a free piston in said socket, means on said free piston holding it in said socket, a passage extending axially within said pipe, means for supplying gaseous pressure to displace well liquid from said chamber through said axial passage into said eduction pipe, said free piston comprising a hollow body portion, an auxiliary cylinder reciprocably mounted within said body portion, a port in said body portion connecting the space below the underface of said auxiliary piston with the exterior of said body portion adjacent to the lower end of said axial passage, a second port in said cylinder connecting the space above the upper face of said auxiliary piston with the exterior of the body portion adjacent to the upper end of said axial passage, a flexible sheath mounted in said body portion and isolating the inner face of said second mentioned port from the upper face of said auxiliary piston, oil trapped in the space between said sheath and the upper face of said auxiliary piston, and serving to transmit pressure supplied to the outer face of said sheath to the upper face of said auxiliary piston, said auxiliary piston being actuated to effect the release of said free piston from said socket by the differential pressure created by well fluids flowing through said axial passage and acting on opposite sides of said auxiliary piston through said ports, and means for supplying gaseous pressure beneath said free piston to raise it up the said eduction pipe.

24. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, a socket at the lower end of said eduction pipe to receive said free piston when it reaches the limit of its downward travel, means for automatically securing said free piston when it enters said socket, means for supplying gaseous pressure to displace well fluids from said chamber into said pipe to build up a slug of liquid above said free piston, an orifice through which said well fluids are constrained to flow when they are displaced from said chamber to build up said slug, and means responsive to a predetermined decrease in the differential pressure across said orifice created by the well fluids flowing therethrough to effect the release of said holding means and release the free piston to travel up said eduction pipe, a gas by-pass passage in said socket, means on said free piston isolating said gas by-pass passage from the interior of said eduction pipe when said free piston is in said socket, and means for supplying gaseous pressure through said by-pass passage when said free piston is released from said socket to raise it and the slug formed above it up said eduction pipe to the well surface.

25. In apparatus for raising liquid in wells by gaseous pressure, a vertical liquid eduction pipe, a free piston adapted to travel up and down inside said pipe, a resilient sleeve surrounding part of said free piston, means for automatically holding said free piston at the lower end of said pipe when said piston reaches the limit of its downward travel, means for supplying gaseous pressure to displace well fluids into said pipe to build up a slug of liquid above said free piston, an orifice through which said well fluids are constrained to flow to build up said slug, and means responsive to a predetermined change in the differential pressure across said orifice created by the well fluids flowing therethrough to effect the release of said holding means and release the free piston to travel up said eduction pipe and expand said resilient sleeve to make sliding sealing engagement with the inner wall of said pipe, and means for supplying gaseous pressure beneath said free piston to raise it and the slug formed above it up said eduction pipe to the well surface.

26. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reaches the limit of its downward travel, means for supplying gaseous pressure to displace well fluids from said chamber into said pipe to build up a slug of liquid above said free piston, an orifice through which said well fluids are constrained to flow when they are displaced from said chamber to build up said slug, said free piston comprising a hollow body portion, an auxiliary piston reciprocably mounted in said hollow body portion, spring means for moving said auxiliary piston in one direction, a second auxiliary piston in said hollow body of said free piston and normally supported in a position to hold said spring means inoperative to move said first mentioned auxiliary piston, means for moving said first mentioned auxiliary piston in the opposite direction against the action of said spring means in accordance with a rise in the differential pressure created across said orifice as the well fluids flow therethrough to bulid up said slug in said eduction pipe, means connecting the second auxiliary piston with the eduction pipe whereby after said first mentioned auxiliary piston has been moved in the opposite direction against said spring means, the absolute pressure in said eduction pipe is effective to operate on said second auxiliary piston to move it to a position spaced from said spring means whereby said spring means is free to move said first mentioned auxiliary piston upon a reduction in said differential pressure, to effect the release of said holding means and release the free piston to travel up said eduction pipe, and means for supplying gaseous pressure beneath said free piston to raise it and the slug formed above it up said eduction pipe to the well surface.

27. Apparatus as claimed in claim 26 comprising a cylinder in the hollow body portion of said free piston in which said second mentioned auxiliary piston is reciprocably mounted, a supply of low pressure gas enclosed in said cylinder and acting on one side of said piston, a spring in said cylinder acting on the same side of the piston as said low pressure gas, means connecting space in said cylinder on the opposite side of said piston with the eduction pipe whereby the absolute pressure in said pipe if effective to move said piston against the combined pressure of said gas and said spring and a relief valve in said cylinder for automatically relieving any excess fluid from the space of said cylinder adapted to contain gas at low pressure.

28. In apparatus for raising liquid in wells by gaseous pressure, a vertical liquid eduction pipe, a displacement chamber adjacent to the lower end of said eduction pipe for collecting fluids from the well, conduit means connecting said chamber with the lower end of said pipe, a free piston adapted to travel up and down inside said pipe, means for automatically holding said free piston at the lower end of said pipe when said piston reached the limit of its downward travel, said free piston having a hollow body portion, a member slidably mounted in said body portion, a spring adapted to actuate said member, detent means for holding said member against movement relative to said body portion with the said actuating spring in loaded condition, an auxiliary piston reciprocably mounted in said hollow body portion, means connected with said auxiliary piston for releasing said detent means, a second auxiliary piston reciprocably mounted in said body portion, a spring acting on said second mentioned auxiliary piston and of greater strength than said first mentioned actuating spring, means whereby said spring of greater strength moves said second auxiliary piston to displace said slidable member to load the actuating spring of the said member, means for supplying gaseous pressure to displace well fluids from said chamber into said pipe to build up a slug of liquid above said free piston, an orifice through which said well fluids are constrained to flow when they are displaced from said chamber to build up said slug, means connecting said second auxiliary piston with the pressure prevailing in said eduction pipe whereby the absolute pressure in said pipe is effective to move said second auxiliary piston away from said slidable member to permit the latter to be moved by its actuating spring when the said detent means are released, and means responsive to a predetermined change in the differential pressure across said orifice created by the well fluids flowing therethrough to actuate said first mentioned auxiliary piston to release said detent means and free said member to be actuated by its spring to effect the release of said holding means and release the free piston to travel up said eduction pipe, and means for supplying gaseous pressure beneath said free piston to raise it and the slug formed above it up said eduction pipe to the well surface.

29. Apparatus as claimed in claim 28 wherein said second auxiliary piston is reciprocably mounted in a cylinder in the body of the free piston, the portion of the space in said cylinder, on one side of said piston, being filled with gas at low pressure and housing a spring acting on the same side of the piston as the low pressure gas, the portion of the space in said cylinder on the opposite side of said piston being connected with the said eduction pipe whereby the absolute pressure in said pipe is transmitted to said opposite side of said piston to displace said piston against the combined pressure of said low pressure gas and said spring, and a relief valve in said cylinder for automatically relieving any excess fluid from the space of the cylinder filled with low pressure gas.

30. A free piston adapted for upward and downward travel inside a vertical liquid eduction pipe of apparatus for raising liquid up said pipe by gaseous pressure, said free piston comprising a hollow body portion, means on said body portion for automatically securing said free piston at one position in said pipe, means located within said hollow body portion for effecting the release of said securing means in accordance with a change in the differential pressure of well fluids flowing past said free piston, catcher means at the upper end of said free piston adapted to be engaged by a fishing tool lowered on a line down the said eduction pipe and means in said body of the piston operable to be moved upwardly a short distance relative to said free piston body to release said securing means on an upward pull being applied to said catcher means by the said fishing tool.

31. In apparatus for raising liquid in wells by gaseous pressure, a vertical liquid eduction pipe, a free piston adapted to travel up and down inside said pipe, means for automatically holding said free piston at the lower end of said pipe when said piston reaches the limit of its downward travel, means for exhausting gas out of the eduction pipe above said free piston when the latter is held at the lower end of said pipe to effect a reduction of pressure in said pipe relative to the pressure of the well to permit well fluids to flow into said pipe to build up a slug of liquid above said free piston, an orifice through which said well fluids are constrained to flow to build up said slug, and means responsive to a predetermined change in the differential pressure across said orifice created by the well fluids flowing therethrough to effect the release of said holding means and release the free piston to travel up said eduction pipe, and means for supplying gaseous pressure beneath said free piston to raise it and the slug formed above it up said eduction pipe to the well surface.

32. In apparatus for raising liquid in wells by gaseous pressure, a vertical liquid eduction pipe, a free piston adapted to travel up and down inside said pipe, means for automatically holding said free piston at the lower end of said pipe when said piston reaches the limit of its downward travel, valve means at the upper end of said education pipe, means opening said valve means when the free piston is held at the lower end of said eduction pipe, said valve means when open serving to bleed off gas from said eduction pipe above said free piston to build up a slug of liquid above said free piston, an orifice through which said well fluids are constrained to flow to build up said slug, and means responsive to a predetermined change in the differential pressure across said orifice created by the well fluids flowing therethrough to effect the release of said holding means and release the free piston to travel up said eduction pipe, and means for supplying gaseous pressure beneath said free piston to raise it and the slug formed above it up said eduction pipe to the well surface and means operable by the free piston on arriving at the upper end of said eduction pipe to close said valve means.

*33. A plunger for raising liquid from wells through an eduction pipe by the action of gas under pressure comprising a body of such cross-sectional configuration as to provide a flow space between itself and the walls of said eduction pipe and including a flexible seal disposed on the outer circumference of said body and expansible radially to close said space, an expander member disposed within said body and coupled to said seal, said expander member being movable to increase the diameter of said seal to close said space and produce thereby a substantially impermeable plug in an eduction pipe in which the plunger is to be disposed when said plunger is at the lower end of its return stroke and to decrease the diameter of said seal when said plunger is at the upper end of its power stroke to open said space to provide a substantial flow passage across said body.*

*34. A gas lift plunger for raising a well liquid through an eduction pipe which comprises, in combination, a body adapted for upward and downward travel in the eduction pipe in which it is to be disposed and of such cross-sectional configuration relative to that of the eduction pipe as to provide a substantial flow space between the body and the eduction pipe, said body including expansible sealing means which when expanded closes said space to provide a substantially impermeable plug in said eduction pipe, means movable relative to and carried by the body providing a force transmitting connection with the expansible sealing means to expand and retract the same, said body having a substantially imperforate portion preventing flow of well liquid internally of said expansible means while the latter is in closed and open positions.*

*35. A gas lift plunger for raising a well liquid through an eduction pipe which comprises, in combination, a body adapted for upward and downward travel in the eduction pipe in which it is to be disposed and including an annular radially expansible sealing means disposed on its outer surface, said body and sealing means, with the latter retracted, being of sufficiently smaller cross-sectional area than the eduction pipe as to provide a substantial flow passage between the sealing means and the walls of the eduction pipe, said body also including an imperforate portion preventing flow of well liquid internally past the sealing means, and means movable relative to and carried by the body providing a force transmitting connection with the expansible sealing means to expand and retract the same.*

*36. A gas lift plunger for raising liquid through an eduction pipe which comprises in combination, a body outwardly expansible sealing means carried by the body externally thereof, means carried by the body including a part movable responsive to a fluid pressure applied thereto, and a force transmitting connection between said movable part and said sealing means so that said part can be moved by fluid pressure to expand said sealing means when said plunger is at the lower end of its return stroke.*

*37. A gas lift plunger for raising liquid through an eduction pipe which comprises in combination, a body, outwardly expansible sealing means carried by the body externally thereof, a part carried by the body and movable responsive to a differential in pressures applied thereto, and a force transmitting connection between said movable part and said sealing means so that said part can be moved by fluid pressure to expand said sealing means when said plunger is at the lower end of its return stroke.*

*38. A gas lift plunger for raising liquid through an eduction pipe which comprises in combination, a body, outwardly expansible sealing means carried by the body externally thereof, pressure responsive means including a movable part closing off a chamber in said body, said part having opposing effective pressure surfaces with one such surface exposed to fluid in said chamber and the other such surface being exposed to fluid in said eduction pipe when the plunger is placed in said pipe, and a force transmitting connection between said movable part and said sealing*

*means so that said part can be moved by a force resulting from a difference in pressures applied to said surfaces to expand said sealing means while the plunger is at the lower end of its return stroke.*

*39. The plunger of claim 38 in combination with resilient means urging said pressure responsive means and said part in a direction to retract said sealing means.*

NORMAN F. BROWN.

References Cited in the file of this patent or the original patent

UNITED STATES PATENTS

| Number | Name | Date |
|---|---|---|
| 1,776,889 | Claytor | Sept. 30, 1930 |
| 1,819,994 | Claytor | Aug. 18, 1931 |
| 1,845,181 | Penrod | Sept. 16, 1932 |
| 1,930,412 | Brown | Oct. 10, 1933 |
| 2,162,418 | Brown | June 13, 1939 |
| 2,515,291 | Brown | July 18, 1950 |